No. 607,559. Patented July 19, 1898.
G. A. WOODMAN.
PNEUMATIC TIRE FOR BICYCLES.
(Application filed July 9, 1896.)

(No Model.)

Witnesses.
Robt Everitt
Thos. A. Gunn

Inventor.
George A. Woodman.
By James L. Norris.
Atty.

THE NORRIS PETERS CO., PHOTO-LITHO., WASHINGTON, D. C.

UNITED STATES PATENT OFFICE.

GEORGE A. WOODMAN, OF LIMA, OHIO, ASSIGNOR OF ONE-HALF TO WILLIAM T. AGERTER, OF SAME PLACE.

PNEUMATIC TIRE FOR BICYCLES.

SPECIFICATION forming part of Letters Patent No. 607,559, dated July 19, 1898.

Application filed July 9, 1896. Serial No. 598,595. (No model.)

*To all whom it may concern:*

Be it known that I, GEORGE A. WOODMAN, a citizen of the United States, residing at Lima, in the county of Allen and State of Ohio, have invented new and useful Improvements in Pneumatic Tires for Bicycles and other Vehicles, of which the following is a specification.

My invention relates to pneumatic tires for bicycles and other vehicles. My purpose is to provide a tire of this class with a single continuous patching-film lying in the interior of the tire and having attachment thereto along the tread side, its free unattached edges overlapping the rim side of the tire or each other whereby the overlapped independent parts shall be removed from all danger of injury by the penetration of a sharp puncturing point or edge entering the tread of the tire and shall be separately and successively applicable to the inner surface of the tread side of the tire, thereby enabling me to close two punctures occurring successively at the same point or so nearly coincident that a single patching film or ply could not close both punctures.

It is my object also to provide a patching ply or film having two independent overlaps capable of separate and successive use and adapted to a single-tube or "hose-pipe" tire as well as to a tire having an inner air-tube, the construction being such that the overlapped separate portions shall be held up against the rim side of the interior of the tire until such time as either or both may be used.

The invention consists, to these ends, in the novel features of construction and new combinations of parts hereinafter fully explained and then particularly pointed out and defined in the claims which conclude this specification.

For the purposes of the following description reference will be had to the accompanying drawings, in which—

Figure 1:
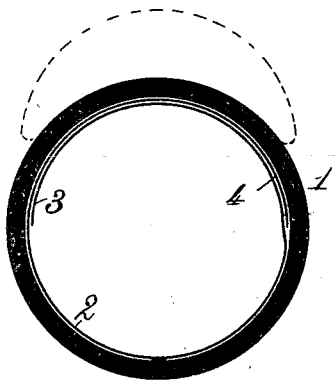
Figure 2:
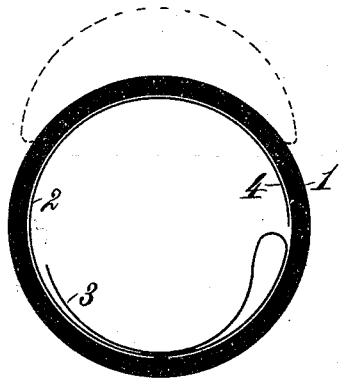
Figure 3:
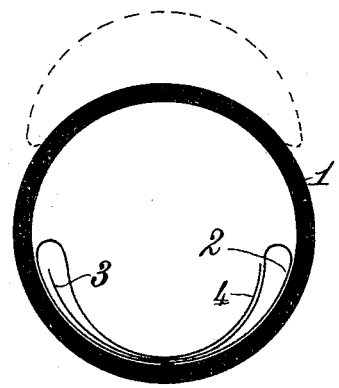
Figure 4:
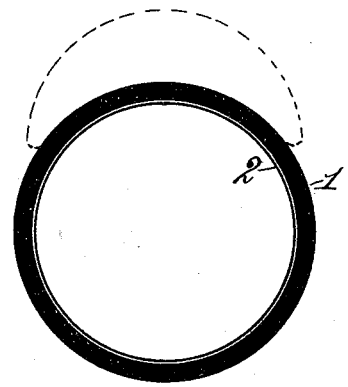

Figure 1 is a transverse section of a pneumatic tire provided with my invention. Fig. 2 is a similar section showing the manner of applying one of the overlaps of the film to a puncture. Fig. 3 is a cross-section showing the second overlap of the patching-film applied to a second puncture at or nearly at the point where the first was made. Fig. 4 is a sectional view showing a modified construction.

The reference-numeral 1 in said drawings indicates a pneumatic tire which in this instance I have shown as a single-tube or hose-pipe tire, although my invention may be used without any material change in a tire having an inner air-tube. This tire is seated in the channeled rim of a bicycle or other wheel in the usual manner, said rim being shown in the drawings by dotted lines.

Within the tire is arranged a patching-film 2, consisting of a thin strip of rubber, having a width preferably in excess of the interior circumference of the tire and having such length that it will extend entirely around or throughout said interior. This strip is attached to the inner face of the tread side of the tire, the line of said attachment being the central longitudinal part of the strip 2 and the corresponding part of the tread side of the tire. This attachment may be made by means of cement or in any other suitable manner, and it may also be continuous from end to end of the strip or it may be at suitable intervals. Upon each side of said line of attachment is a free or unattached strip of the patching-film. These strips are indicated by the numerals 3 and 4 and may be overlapped one upon the other, as seen in Fig. 1 of the drawings, the interior air-pressure holding these overlapping portions against the rim side of the tire, where they are removed from the reach of any sharp point or edge which may penetrate the tread portion of the tire. These parts, however, being disconnected from each other can be readily picked up when applied to a puncture, no material obstruction being offered by the air-pressure.

The method of patching is similar to that now in use in this respect—that is, a drop of rubber cement is introduced through the puncture and the tread side is pressed in until it meets the adjacent overlap 3 of the film, thereby enabling the cement to attach it directly over the puncture, as shown in Fig. 2. The air may, if necessary, be partly discharged from the tire, and the latter can be pumped to the required distension afterward.

If a second puncture is made at the same point or very near the same point, it may be closed by taking up the portion 4 in the same manner. If, however, the second puncture does not penetrate the portion 3, which was picked up before that puncture was made, then the part 3 may be used to patch the second as well as the first break. Thus the film can be used to close several punctures which occur near the same point.

I may without departing from the invention bring the free edges of the patching-film into juxtaposition upon the rim side instead of overlapping, as shown in Fig. 4. In other respects the invention and the method of patching are unchanged.

What I claim is—

1. A pneumatic tire, having an interior patching-film consisting of a single strip of rubber attached centrally along the center of the inner face of the tread side, and having two free, or unattached portions on opposite sides of the line of attachment and overlapping the rim side, substantially as described.

2. A pneumatic tire for a bicycle or other vehicle, having an interior patching-film consisting of a single strip of rubber of a width greater than the interior circumference of the tire, said strip being attached along its central part to the inner face of the tread of the tire and having two free portions on opposite sides of the line of attachment overlapped one on the other and held against the rim side by the interior air-pressure, substantially as described.

In testimony whereof I have hereunto set my hand in presence of two subscribing witnesses.

GEORGE A. WOODMAN.

Witnesses:
FRANCIS L. ASHTON,
NATHAN OMAR JAY.